United States Patent
Wang et al.

(10) Patent No.: US 11,763,023 B2
(45) Date of Patent: Sep. 19, 2023

(54) INFORMATION ACQUISITION METHOD AND DEVICE, AND STORAGE MEDIUM

(71) Applicant: BEIJING XIAOMI MOBILE SOFTWARE CO., LTD., Beijing (CN)

(72) Inventors: Xin Wang, Beijing (CN); Shuting Tian, Beijing (CN); Lin Fan, Beijing (CN); Tianfu Ren, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 202 days.

(21) Appl. No.: 16/914,420

(22) Filed: Jun. 28, 2020

(65) Prior Publication Data

US 2021/0182421 A1  Jun. 17, 2021

(30) Foreign Application Priority Data

Dec. 16, 2019 (CN) .......................... 201911293223.0

(51) Int. Cl.
*G06F 21/62* (2013.01)
*G06F 9/54* (2006.01)
(Continued)

(52) U.S. Cl.
CPC .......... *G06F 21/6245* (2013.01); *G06F 9/541* (2013.01); *H04W 8/22* (2013.01); *H04W 12/02* (2013.01)

(58) Field of Classification Search
None
See application file for complete search history.

(56) References Cited

U.S. PATENT DOCUMENTS

2008/0104615 A1* 5/2008 Nolan .................... G16H 10/60
                                                           719/328
2011/0252456 A1  10/2011 Hatakeyama
(Continued)

FOREIGN PATENT DOCUMENTS

CN      108334780 A      7/2018
CN      109145603 A      1/2019
(Continued)

OTHER PUBLICATIONS

Gu J, Huang R, Jiang L, Qiao G, Du X, Guizani M. A Fog Computing Solution for Context-Based Privacy Leakage Detection for Android Healthcare Devices. Sensors (Basel). Mar. 8, 2019;19(5):1184. doi: 10.3390/s19051184. PMID: 30857140; PMCID: PMC6427819. (Year: 2019).*

(Continued)

*Primary Examiner* — Alexander Lagor
*Assistant Examiner* — Felicia Farrow
(74) *Attorney, Agent, or Firm* — SYNCODA LLC; Feng Ma

(57) ABSTRACT

An information acquisition method and device includes: acquiring privacy-related information when calling, with a target application (App), an application programming interface (API) to acquire privacy information of a terminal, wherein the privacy-related information is associated with a process of the target App acquiring the privacy information; storing the privacy-related information; and reading, by a designated App, the privacy-related information stored in a preset time period, and uploading, by the designated App, the privacy-related information read to a server side.

13 Claims, 8 Drawing Sheets

(51) Int. Cl.
  *H04W 8/22* (2009.01)
  *H04W 12/02* (2009.01)

(56) References Cited

U.S. PATENT DOCUMENTS

| | | | |
|---|---|---|---|
| 2013/0198849 A1* | 8/2013 | Aad | G06F 21/577 |
| | | | 726/26 |
| 2015/0227746 A1* | 8/2015 | Chen | G06F 21/54 |
| | | | 726/25 |
| 2019/0121987 A1 | 4/2019 | Ferrara et al. | |
| 2019/0318100 A1 | 10/2019 | Bhatia et al. | |
| 2020/0245150 A1* | 7/2020 | Zhao | H04W 12/02 |
| 2020/0320066 A1* | 10/2020 | Cao | G06F 16/252 |

FOREIGN PATENT DOCUMENTS

| | | | | |
|---|---|---|---|---|
| CN | 109739748 A | | 5/2019 | |
| EP | 2375360 A1 | * | 10/2011 | G06F 21/604 |

OTHER PUBLICATIONS

Extended European Search Report in Application No. 20195317.1, dated Feb. 23, 2021.

* cited by examiner

INFORMATION ACQUISITION METHOD AND DEVICE, AND STORAGE MEDIUM

CROSS-REFERENCE TO RELATED APPLICATION

This application claims priority to Chinese Patent Application No. 201911293223.0 filed on Dec. 16, 2019, the disclosure of which is hereby incorporated by reference in its entirety.

BACKGROUND

At present, many applications (Apps) may collect private information of a terminal to portrait a user, and accurately recommend information streams.

However, in order to protect personal privacy information, ensuring that a behavior of acquiring the private information of the terminal complies with a preset user privacy protection rule is becoming a problem that App developers and operators may have to consider.

SUMMARY

Various embodiments of the present disclosure provide a communication method and device, and a storage medium.

According to a first aspect of embodiments of the present disclosure, there is provided an information acquisition method, which is applied to a terminal and includes:

acquiring privacy-related information when calling, by a target application (App), an application programming interface (API) to acquire privacy information of the terminal, wherein the privacy-related information is associated with a process of the target App acquiring the privacy information;

storing the privacy-related information; and reading, by a designated App, the privacy-related information stored in a preset time period, and uploading, by the designated App, the privacy-related information read to a server side.

In some embodiments, private information instrumentation is performed on the API in advance in a manner of:

performing, by a read-only memory (ROM), instrumentation on a plurality of the APIs being called to acquire the privacy information in a framework layer for each piece of the private information.

In some embodiments, the privacy information includes at least one of:

international mobile equipment identity (IMEI) information of the terminal, system identification information of the terminal, and a mobile phone number of the terminal.

In some embodiments, the privacy-related information includes at least one of:

process and thread information, context information, and log information.

In some embodiments, the step of storing the privacy-related information includes:

storing the privacy-related information to a designated directory by calling the API in the designated App.

The step of reading, by a designated App, the privacy-related information stored in a preset time period includes:

reading, by the designated App, the privacy-related information stored in the designated directory in the preset time period.

In some embodiments, the designated directory is a directory preset on a secure digital memory card for storing the privacy-related information.

In some embodiments, the step of reading, by a designated App, the privacy-related information stored in a preset time period, and uploading, by the designated App, the privacy-related information read to a server side includes:

reading, by a target process of the designated App, the privacy-related information stored in the preset time period, and uploading, by the target process, the privacy-related information read to the server side, wherein the target process is a process of the designated App which is online at any time.

According to a second aspect of the embodiments of the present disclosure, there is provided an information acquisition method, which is applied to a server side and includes:

receiving privacy-related information uploaded by a terminal, wherein the privacy-related information is information associated with a process of a target application (App) acquiring privacy information of the terminal; and determining a target detection result according to the privacy-related information, wherein the target detection result is configured to indicate whether the process of the target App acquiring the privacy information of the terminal complies with a preset user privacy protection rule.

In some embodiments, the step of determining a target detection result according to the privacy-related information includes:

determining, according to the privacy-related information, App identification information of the target App and first privacy information of the terminal acquired by the target App;

determining second privacy information corresponding to the App identification information of the target App according to a correspondence between preset App identification information and privacy information allowed to be acquired when the App is called; and determining the target detection result as that the process of the target App acquiring the privacy information of the terminal complies with the preset user privacy protection rule in response to that the second privacy information includes the first privacy information, and otherwise determining the target detection result as that the process of the target App acquiring the privacy information of the terminal does not comply with the preset user privacy protection rule.

In some embodiments, the method further includes:

uploading the target detection result to a detection platform.

According to a third aspect of the embodiments of the present disclosure, there is provided an information acquisition device, which is applied to a terminal and includes:

an acquisition module, configured to acquire privacy-related information when an application programming interface (API) is called by a target application (App) to acquire privacy information of the terminal, wherein the privacy-related information is associated with a process of the target App acquiring the privacy information;

a storage module, configured to store the privacy-related information; and an execution module, configured to read, by a designated App, the privacy-related information stored in a preset time period, and upload, by the designated App, the privacy-related information read to a server side.

In some embodiments, the device further includes:

an instrumentation module, configured to perform, by a read-only memory (ROM), instrumentation on a plurality of the APIs being called to acquire the privacy information in a framework layer for each piece of the private information.

In some embodiments, the privacy information includes at least one of:

international mobile equipment identity (IMEI) information of the terminal, system identification information of the terminal, and a mobile phone number of the terminal.

In some embodiments, the privacy-related information includes at least one of:

process and thread information, context information, and log information.

In some embodiments, the storage module includes:

a storage sub-module, configured to store the privacy-related information to a designated directory by calling the API in the designated App.

The execution module includes:

a reading sub-module, configured to read, by the designated App, the privacy-related information stored in the designated directory in the preset time period.

In some embodiments, the designated directory is a directory preset on a secure digital memory card for storing the privacy-related information.

In some embodiments, the execution module includes:

an execution sub-module, an execution sub-module, configured to read, by a target process of the designated App, the privacy-related information stored in the preset time period, and upload, by the target process, the privacy-related information read to the server side, wherein the target process is a process of the designated App which is online at any time.

According to a fourth aspect of the embodiments of the present disclosure, there is provided an information acquisition device, which is applied to a server side and includes:

a receiving module, configured to receive privacy-related information uploaded by a terminal, wherein the privacy-related information is information associated with a process of a target application (App) acquiring privacy information of the terminal; and a detection result determining module, configured to determine a target detection result according to the privacy-related information, wherein the target detection result is configured to indicate whether the process of the target App acquiring the privacy information of the terminal complies with a preset user privacy protection rule.

In some embodiments, the detection result determining module includes:

a first determining sub-module, configured to determine, according to the privacy-related information, App identification information of the target App and first privacy information of the terminal acquired by the target App;

a second determining sub-module, configured to determine second privacy information corresponding to the App identification information of the target App according to a correspondence between preset App identification information and privacy information allowed to be acquired when the App is called; and a third determining sub-module, configured to determine the target detection result as that the process of the target App acquiring the privacy information of the terminal complies with the preset user privacy protection rule in response to that the second privacy information comprises the first privacy information, and otherwise determine the target detection result as that the process of the target App acquiring the privacy information of the terminal does not comply with the preset user privacy protection rule.

In some embodiments, the device further includes:

an uploading module, configured to upload the target detection result to a detection platform.

According to a fifth aspect of the embodiments of the present disclosure, there is provided a computer-readable storage medium having a computer program stored thereon, wherein the computer program is configured to execute any of the information acquisition methods described in the first aspect above.

According to a sixth aspect of the embodiments of the present disclosure having a computer program stored thereon, wherein the computer program is configured to execute any of the information acquisition methods described in the second aspect above.

According to a seventh aspect of the embodiments of the present disclosure, there is provided an information acquisition device, which is applied to a terminal and includes:

a processor; and a memory device for storing executable instructions of the processor, wherein the processor is configured to:

acquire privacy-related information when calling, by a target application (App), an application programming interface (API) to acquire privacy information of the terminal, wherein the privacy-related information is associated with a process of the target App acquiring the privacy information;

store the privacy-related information; and read, by a designated App, the privacy-related information stored in a preset time period, and upload, by the designated App, the privacy-related information read to a server side.

According to an eighth aspect of the embodiments of the present disclosure, there is provided an information acquisition device, which is applied to a server side and includes:

a processor; and a memory device for storing executable instructions of the processor, wherein the processor is configured to:

receive privacy-related information uploaded by a terminal, wherein the privacy-related information is information associated with a process of a target application (App) acquiring privacy information of the terminal; and determine a target detection result according to the privacy-related information, wherein the target detection result is configured to indicate whether the process of the target App acquiring the privacy information of the terminal complies with a preset user privacy protection rule.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in the specification and constitute a part of the disclosure, show exemplary embodiments of the present disclosure, and together with the specification, serve to explain the principle of the present disclosure.

DETAILED DESCRIPTION

Figure 1:
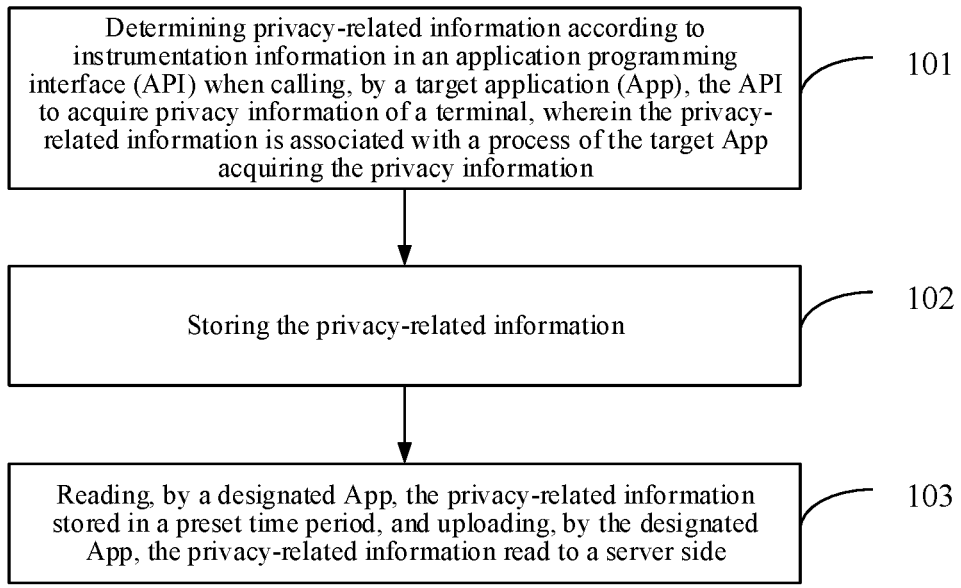
FIG. 1 is a flowchart of an information acquisition method according to some embodiments of the present disclosure.

Exemplary embodiments will be described in detail herein, examples of which are illustrated in the accompanying drawings. When the following description is made with reference to the drawings, the same reference numerals in different figures refer to the same or similar elements unless otherwise indicated. The embodiments described in the following exemplary embodiments do not represent all embodiments consistent with the present disclosure. Instead, they are merely examples of devices and methods consistent with aspects of the present disclosure as recited in the appended claims.

The terms used in the present disclosure are merely for the purpose of describing particular embodiments and are not intended to limit the present disclosure. As used in the present disclosure and the appended claims, the singular forms "a," "the" and "said" are intended to include the plural forms as well, unless the context clearly indicates otherwise. It should also be understood that the term "and/or" as used herein refers to and includes any or all possible combinations of one or more of the associated listed items.

It should be understood that, although the terms first, second, third, etc. may be used in the present disclosure to describe various information, such information should not be limited by these terms. These terms are only used to distinguish the same type of information from each other. For example, without departing from the scope of the present disclosure, first information may also be referred to as second information, and similarly, the second information may also be referred to as the first information. Depending on the context, the word "if" as used herein can be interpreted as "upon" or "when" or "in response to determining."

An information acquisition method provided by some embodiments of the present disclosure can be introduced from a terminal side.

The information acquisition method provided by the embodiment of the present disclosure may be applied to a terminal, such as smart phones, tablet computers, personal digital assistants (PDAs), and the like. FIG. 1 shows an information acquisition method according to some embodiments. As shown in FIG. 1, the information acquisition method includes the following steps.

In step 101, when an application programming interface (API) is called by a target application (App) to acquire privacy information of a terminal, privacy-related information is determined according to instrumentation information in the API, wherein the privacy-related information is associated with a process of the target App acquiring the privacy information.

In some embodiments of the present disclosure, the target App may be any App pre-installed on the terminal. The called API may be an API on which private information instrumentation is performed in advance.

The instrumentation refers to inserting some probes into a program on the basis of ensuring original logic integrity of the program. In some embodiments of the present disclosure, that private information instrumentation is performed on the API refers to inserting the probe that can correspond to the privacy information of the terminal into the API. Once the target App calls the API to acquire the privacy information of the terminal, what privacy information the target App has acquired from the terminal can be determined according to the instrumentation.

The private information of the terminal may include but is not limited to at least one of international mobile equipment identity (IMEI) information of the terminal, system identification information of the terminal, and a mobile phone number of the terminal. The system identification information of the terminal may be the identification information of Android, Apple and other systems adopted by the terminal.

In some embodiments of the present disclosure, the information associated with the process of that the target App calls the API on which the privacy information instrumentation is performed in advance to acquire the privacy information of the terminal can be used as the privacy-related information, including but not limited to at least one of process and thread information, context information, and log information.

In step 102, the privacy-related information is stored.

In some embodiments of the present disclosure, the terminal may store all the privacy-related information in the process of that the target App calls the API to acquire the privacy information of the terminal, which facilitates the privacy-related information to be read and uploaded to the server side by the designated App subsequently.

In step 103, the privacy-related information stored in a preset time period is read by a designated App, and the read privacy-related information is uploaded to a server side by the designated App.

In some embodiments of the present disclosure, the designated App may be an App associated with privacy protection on the terminal, such as a security center App. The preset time period may be a preset period length. All the privacy-related information stored in the terminal within the preset time period may be read and uploaded to the server side by the designated App. The server side may be a server, and can determine whether the process of the target App acquiring the privacy information of the terminal complies with a preset user privacy protection rule.

In the above embodiment, when the API is called by the target App to acquire the privacy information of the terminal, the privacy-related information associated with such process may be determined according to the instrumentation information in the API. Then the privacy-related information is stored. After that, the privacy-related information stored in the preset time period may be read by the designated App, and the read privacy-related information is uploaded to the server by the designated App. Subsequently, the server determines, according to the privacy-related information, whether the process of the target App acquiring the privacy information of the terminal complies with the preset user privacy protection rule. The present disclosure can detect whether the process of the target App acquiring the privacy information of the terminal complies with the preset user privacy protection rule, thereby protecting personal privacy of a terminal user and improving network security.

Figure 2:
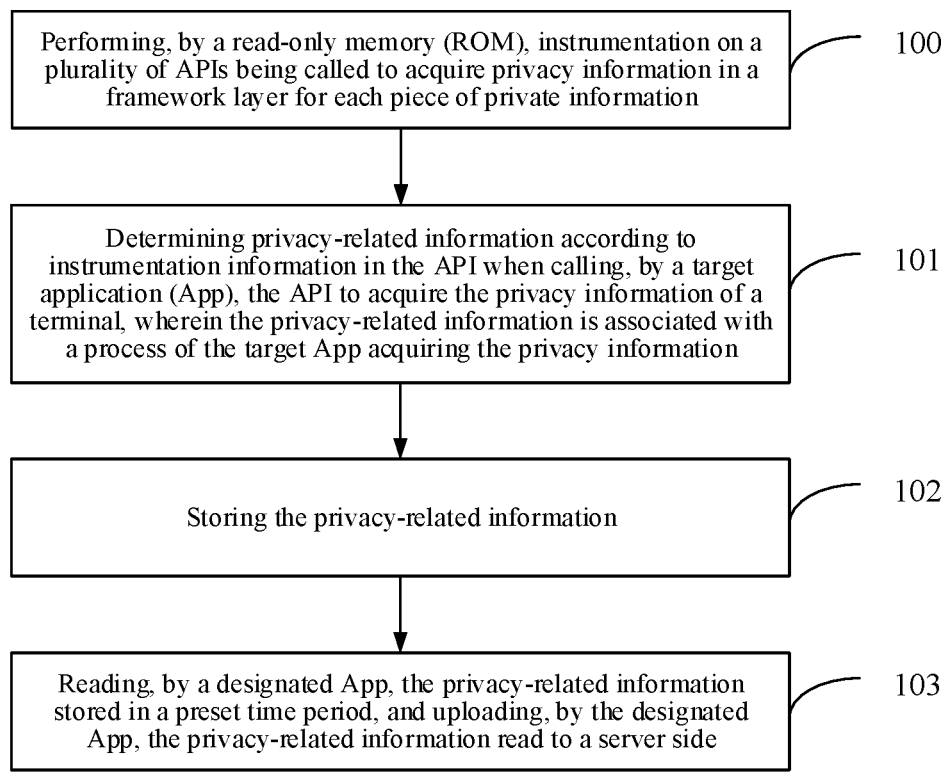
FIG. 2 is a flowchart of another information acquisition method according to some embodiments of the present disclosure.

FIG. 2 is another information acquisition method shown on the basis of the foregoing embodiment shown in FIG. 1. In some other embodiments, as shown in FIG. 2, the method may further include step 100 before the step 101.

In step 100, instrumentation is performed, by a read-only memory (ROM), on a plurality of APIs being called to acquire the privacy information in a framework layer for each piece of private information.

In some embodiments, this step only needs to be executed once for one terminal. When the step is being executed, the instrumentation is performed, by a program in the ROM of the terminal, on the plurality of APIs being called to acquire the privacy information in the framework layer for each piece of private information.

For example, the number of pieces of privacy information is three, and the number of the plurality of APIs is n, and then the n APIs include three instrumentations corresponding to different pieces of privacy information respectively.

In the above embodiments, the instrumentation may be performed in advance, by the ROM of the terminal, on the plurality of the APIs being called to acquire the privacy information in the framework layer, and may be performed for each piece of the private information. Subsequently, the privacy-related information is determined directly according to the instrumentation information in the API, which is easy to be implemented and has high availability.

In some other embodiments, for the above step 102, the API in the designated App may be called to store the privacy-related information to a designated directory.

In some embodiments of the present disclosure, the designated App may be a security center App. Since storage space occupied by the privacy-related information is relatively large, the designated directory may be a directory preset on a secure digital memory (SD) card for storing the privacy-related information.

In the above embodiments, since the storage space occupied by the privacy-related information is relatively large, the directory preset on the secure digital memory card for storing the privacy-related information can be used as the designated directory, thereby storing the privacy-related information to ensure that the complete privacy-related information can be stored.

In some other embodiments, the above step may include: reading, by a target process of the designated App, the privacy-related information stored in the preset time period, and uploading, by the target process, the privacy-related information read to the server side.

In some embodiments of the present disclosure, the target process is a process of the designated App which is online at any time.

In the above embodiments, the target process in the designated App can be used to perform the reading of the privacy-related information and uploading of the same to the server side. The target process is the process of the designated App which is online at any time. Since the target process is online all the time, there is no need to start a separate process to read and upload the privacy-related information, thereby saving process resources.

An information acquisition method provided by an embodiment of the present disclosure will be introduced below from a server side.

Figure 3:
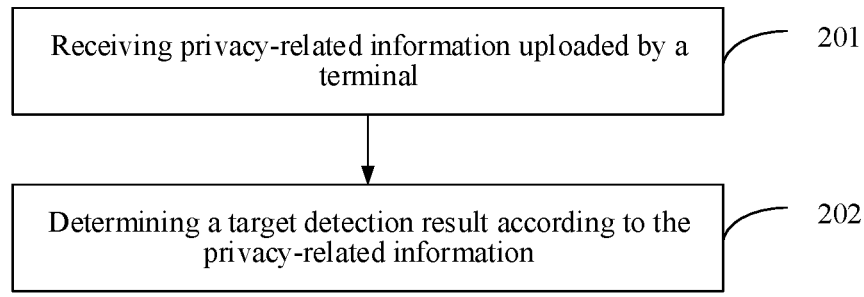
FIG. 3 is a flowchart of another information acquisition method according to some embodiments of the present disclosure.

The information acquisition method provided by the embodiment of the present disclosure may be applied to the server side, such as a server. FIG. 3 is another information acquisition method according to some embodiments, and as shown in FIG. 3, the method includes the following steps.

In step 201, privacy-related information uploaded by a terminal is received.

The privacy-related information is information associated with a process of a target application (App) acquiring privacy information of the terminal, and may include but is not limited to at least one of process and thread information, context information and log information which are associated with the process of the target App acquiring the privacy information of the terminal.

In step 202, a target detection result is determined according to the privacy-related information.

The target detection result is configured to indicate whether the process of the target App acquiring the privacy information of the terminal complies with a preset user privacy protection rule. The preset user privacy protection rule may be the privacy information of the terminal allowed to be called by the App.

For example, App1 is allowed to call IMEI information of the terminal, and App2 is allowed to call the IMEI information and mobile phone number of the terminal.

In the above embodiment, after receiving the privacy-related information uploaded by the terminal, the server may determine, according to the privacy-related information, the target detection result indicating whether the process of the target App acquiring the privacy information of the terminal complies with the preset user privacy protection rule. It achieves the purpose of detecting whether the process of the target App acquiring the privacy information of the terminal complies with the preset user privacy protection rule, so that the personal privacy of the terminal user can be protected and the network security can be improved.

Figure 4:
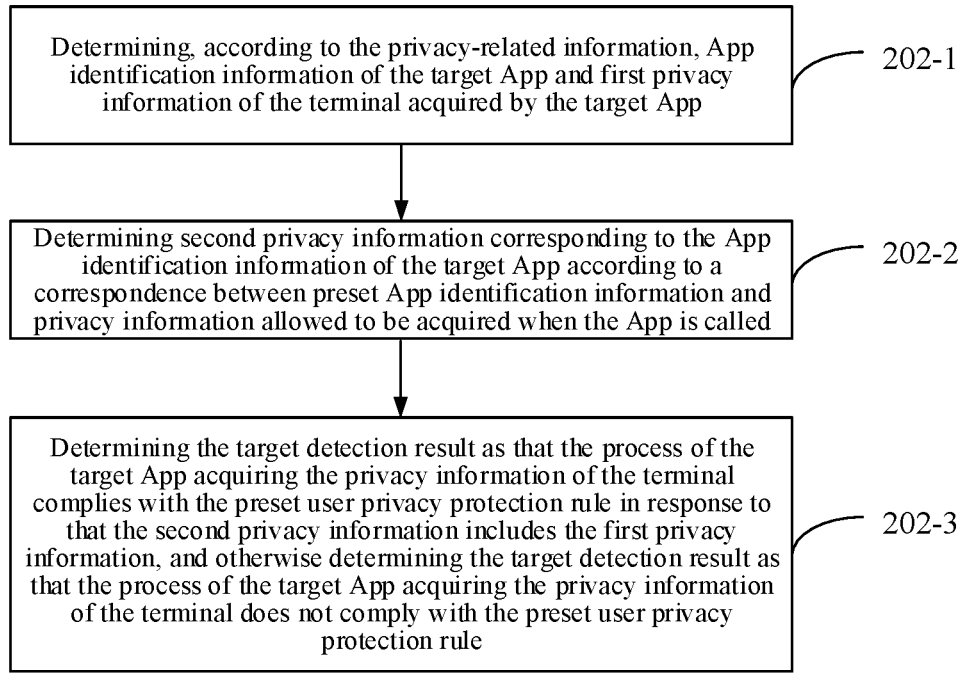
FIG. 4 is a flowchart of another information acquisition method according to some embodiments of the present disclosure.

FIG. 4 shows another information acquisition method based on the foregoing embodiments illustrated in FIG. 3. In some other embodiments, as shown in FIG. 4, the step 202 can include the following steps.

In step 202-1, App identification information of the target App and first privacy information of the terminal acquired by the target App are determined according to the privacy-related information.

In this step, the server side acquires the privacy-related information, and thus can analyze the privacy-related information to acquire the App identification information of the target App and the first privacy information acquired by the target App during the process of acquiring the privacy information of the terminal.

In step 202-2, second privacy information corresponding to the App identification information of the target App is determined according to a correspondence between preset App identification information and privacy information allowed to be acquired when the App is called.

In this step, the server side may pre-store the correspondence, so that the server side can determine the corresponding second privacy information according to the correspondence after determining the App identification information of the target App.

In step 202-3, if the second privacy information includes the first privacy information, it is determined that the target detection result is that the process of the target App acquiring the privacy information of the terminal complies with the preset user privacy protection rule, and otherwise it is determined that the target detection result is that the process of the target App acquiring the privacy information of the terminal does not comply with the preset user privacy protection rule.

For example, if the second privacy information is the IMEI information, and the first privacy information is also the IMEI information, it may be determined that the target detection result is that the process of the target App acquiring the privacy information of the terminal complies with the preset user privacy protection rule.

In another example, if the second privacy information includes the IMEI information and the system identification information, and the first privacy information is the IMEI information and the system identification information, it is determined that the target detection result is that the process of the target App acquiring the privacy information of the terminal does not comply with the preset user privacy protection rule.

In the above embodiments, if the first privacy information is included in the second privacy information, it is determined that the target detection result is that the process of the target App acquiring the privacy information of the terminal complies with the preset user privacy protection rule, and otherwise it is determined that the target detection result is that the process of the target App acquiring the privacy information of the terminal does not comply with the preset user privacy protection rule, which is easy to be implemented and has high availability.

Figure 5:
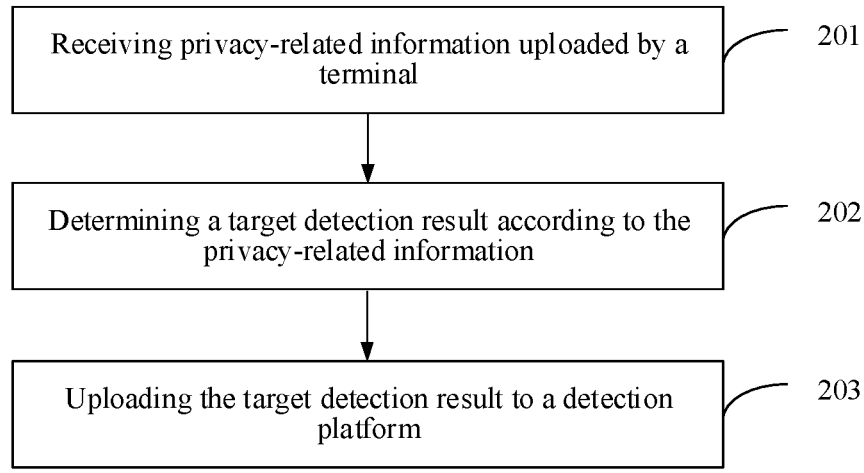
FIG. 5 is a flowchart of another information acquisition method according to some embodiments of the present disclosure.

FIG. 5 shows another information acquisition method based on the foregoing embodiment in FIG. 3. In some other embodiments, as shown in FIG. 5, the method may further include step 203.

In step 203, the target detection result is uploaded to the detection platform.

The server side can also upload the target detection result to the detection platform. The target detection result is output or displayed by the detection platform, so that the terminal privacy protection analysis can be better performed.

Figure 6:
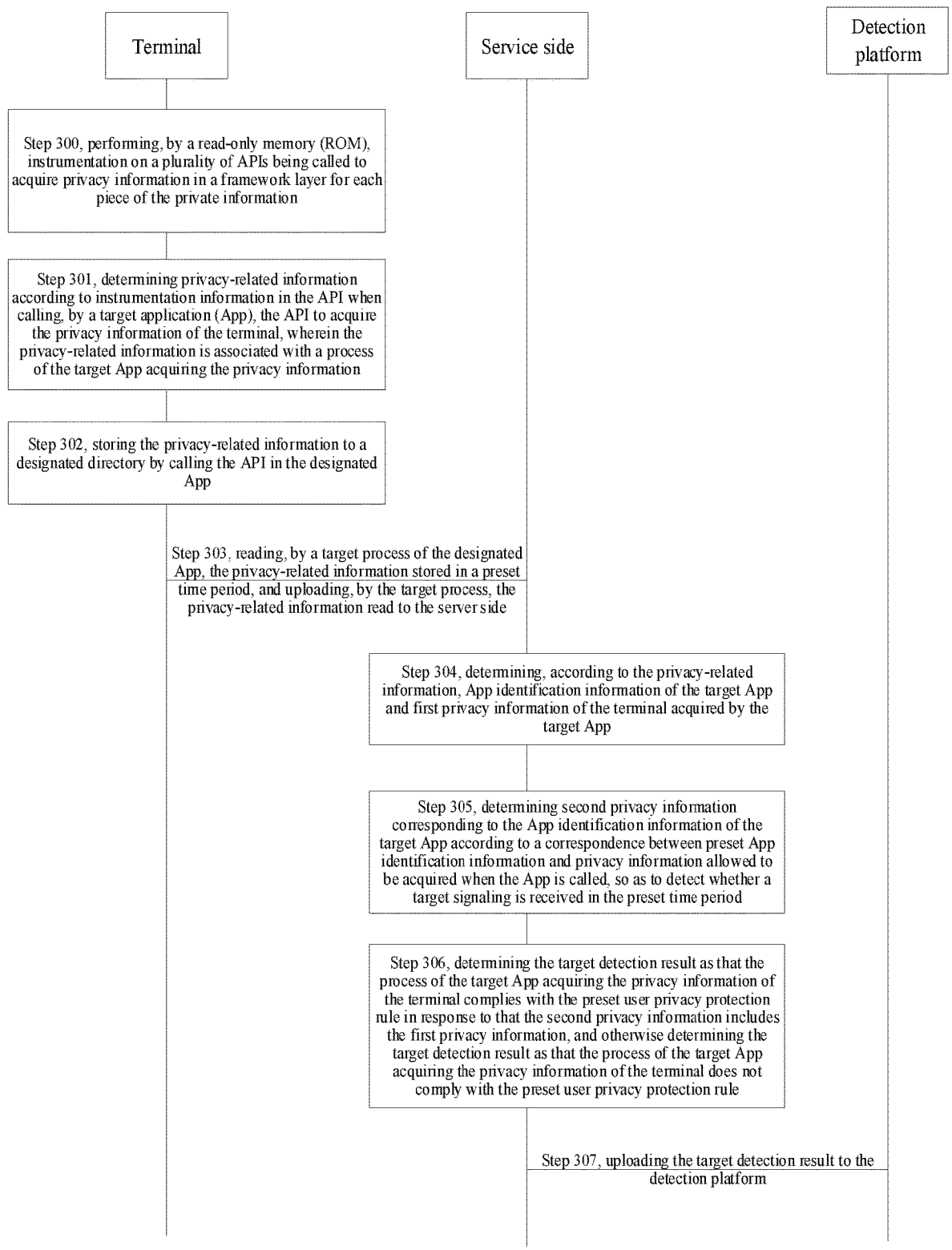
FIG. 6 is a flowchart of another information acquisition method according to some embodiments of the present disclosure.

FIG. 6 shows another information acquisition method according to some embodiments. In some other embodiments, as shown in FIG. 6, the method includes the following steps.

In step 300, the terminal performs, by a read-only memory (ROM), instrumentation on a plurality of APIs being called to acquire privacy information in a framework layer for each piece of private information.

This step only needs to be performed once. After the private information instrumentation is finished, it can be directly executed from step 301 subsequently.

In step 301, the terminal determines privacy-related information associated with a process of a target application (App) acquiring the privacy information according to instrumentation information in the API, when calling, by the target App, the API to acquire the privacy information of the terminal.

The target App may be any App on the terminal. The API may be an API on which the private information instrumentation is performed in advance.

The privacy information includes at least one of international mobile equipment identity (IMEI) information of the terminal, system identification information of the terminal, and a mobile phone number of the terminal.

The privacy-related information includes at least one of process and thread information, context information, and log information.

In step 302, the terminal calls the API in the designated App to store the privacy-related information to a designated directory.

The designated App may be a security center App, and the designated directory may be a directory preset on a secure digital memory card for storing the privacy-related information.

In step 303, the terminal reads, by a target process of the designated App, the privacy-related information stored in the designated directory in a preset time period, and uploads, by the target process, the read privacy-related information to the server side.

The target process is a process of the designated App which is online at any time.

In step 304, the server side determines App identification information of the target App and first privacy information of the terminal acquired by the target App according to the privacy-related information.

In step 305, the server side determines second privacy information corresponding to the App identification information of the target App according to a correspondence between preset App identification information and privacy information allowed to be acquired when the App is called.

In step 306, if the second privacy information includes the first privacy information, the server side determines that the target detection result is that the process of the target App acquiring the privacy information of the terminal complies with a preset user privacy protection rule, and otherwise the server side determines that the target detection result is that the process of the target App acquiring the privacy information of the terminal does not comply with the preset user privacy protection rule.

In step 307, the server side uploads the target detection result to a detection platform.

In the above embodiment, it can detect whether the process of the target App acquiring the privacy information of the terminal complies with the preset user privacy protection rule, thereby protecting personal privacy of a terminal user and improving network security.

Corresponding to the foregoing method embodiments, the present disclosure also provides various device embodiments.

Figure 7:
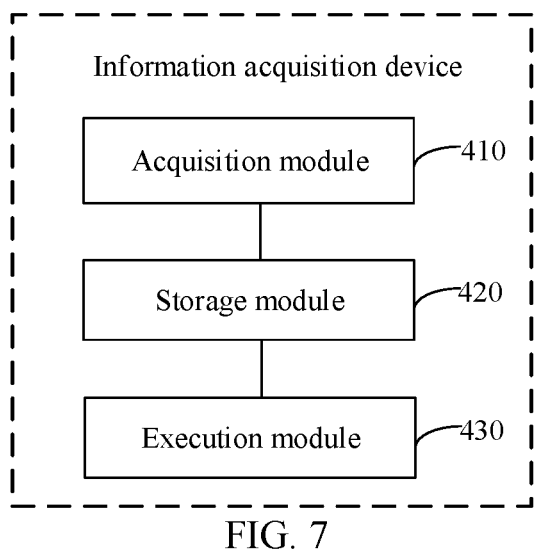
FIG. 7 is a block diagram of an information acquisition device according to some embodiments of the present disclosure.

FIG. 7 is a block diagram of an information acquisition device according to some embodiments of the present disclosure. As shown in FIG. 7, the device is applied to the terminal and includes:

an acquisition module 410, configured to acquire privacy-related information when an application programming interface (API) is called by a target application (App) to acquire privacy information of the terminal, wherein the privacy-related information is associated with a process of the target App acquiring the privacy information;

a storage module 420, configured to store the privacy-related information; and an execution module 430, configured to read, by a designated App, the privacy-related information stored in a preset time period, and upload, by the designated App, the privacy-related information read to a server.

Figure 8:
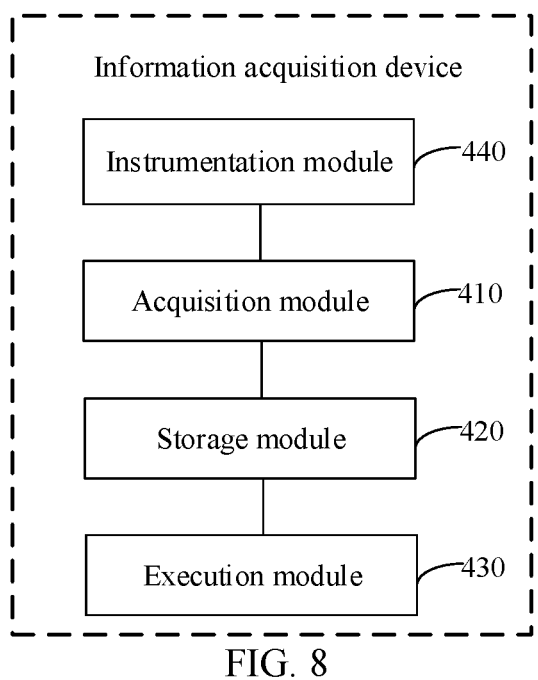
FIG. 8 is a block diagram of another information acquisition device according to some embodiments of the present disclosure.

FIG. 8 is a block diagram of another information acquisition device according to some embodiments of the present disclosure. As shown in FIG. 8, on the basis of the foregoing embodiment of FIG. 7, the device further includes:

an instrumentation module 440, configured to configured to perform, by a read-only memory (ROM), instrumentation on a plurality of the APIs being called to acquire the privacy information in a framework layer for each piece of the private information.

In some embodiments, the privacy information includes at least one of:

international mobile equipment identity (IMEI) information of the terminal, system identification information of the terminal, and a mobile phone number of the terminal.

In some embodiments, the privacy-related information includes at least one of:

process and thread information, context information, and log information.

Figure 9A:
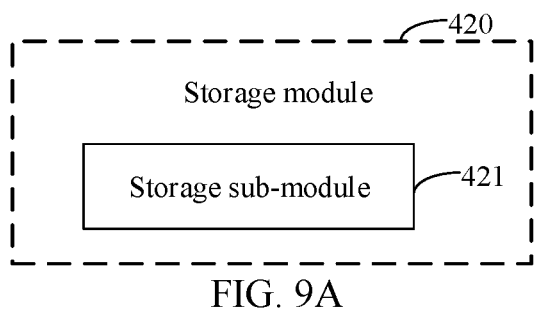
FIG. 9A is a block diagram of another information acquisition device according to some embodiments of the present disclosure.

FIG. 9A shows a block diagram of another information acquisition device according to some embodiments. As shown in FIG. 9A, on the basis of the foregoing embodiment of FIG. 7, the storage module 420 includes:

a storage sub-module 421, configured to store the privacy-related information to a designated directory by calling the API in the designated App.

Figure 9B:
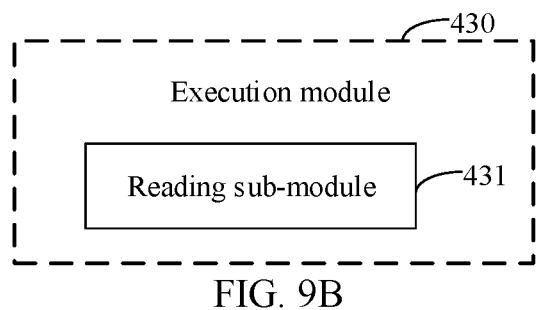
FIG. 9B is a block diagram of another information acquisition device according to some embodiments of the present disclosure.

FIG. 9B is a block diagram of another information acquisition device according to some embodiments. As shown in FIG. 9B, on the basis of the foregoing embodiment of FIG. 9A, the execution module 430 includes:

a reading sub-module 431, configured to read, by the designated App, the privacy-related information stored in the designated directory in the preset time period.

In some embodiments, the designated directory is a directory preset on a secure digital memory card for storing the privacy-related information.

Figure 10:
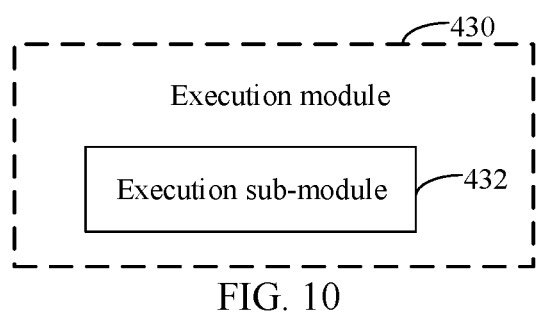
FIG. 10 is a block diagram of another information acquisition device according to some embodiments of the present disclosure.

FIG. 10 is a block diagram of another information acquisition device according to some embodiments. As shown in FIG. 10, on the basis of the foregoing embodiment of FIG. 7, the execution module 430 includes:

an execution sub-module 432, configured to read, by a target process of the designated App, the privacy-related information stored in the preset time period, and upload, by the target process, the privacy-related information read to the server, wherein the target process is a process of the designated App which is online at any time.

Figure 11:
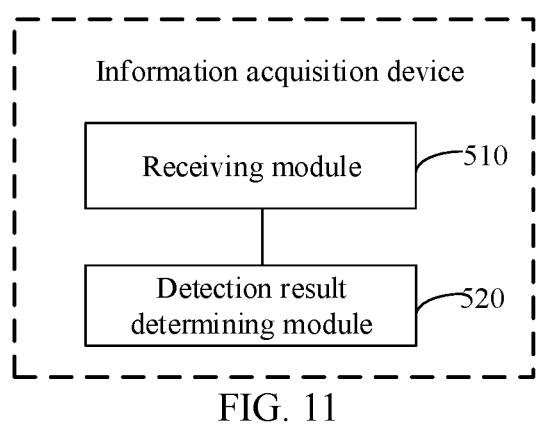
FIG. 11 is a block diagram of another information acquisition device according to some embodiments of the present disclosure.

FIG. 11 is a block diagram of another information acquisition device according to some embodiments. As shown in FIG. 11, the device is applied to a server side and includes:

a receiving module 510, configured to receive privacy-related information uploaded by a terminal, wherein the privacy-related information is information associated with a process of a target application (App) acquiring privacy information of the terminal; and a detection result determining module 520, configured to determine a target detection result according to the privacy-related information, wherein the target detection result is configured to indicate whether the process of the target App acquiring the privacy information of the terminal complies with a preset user privacy protection rule.

Figure 12:
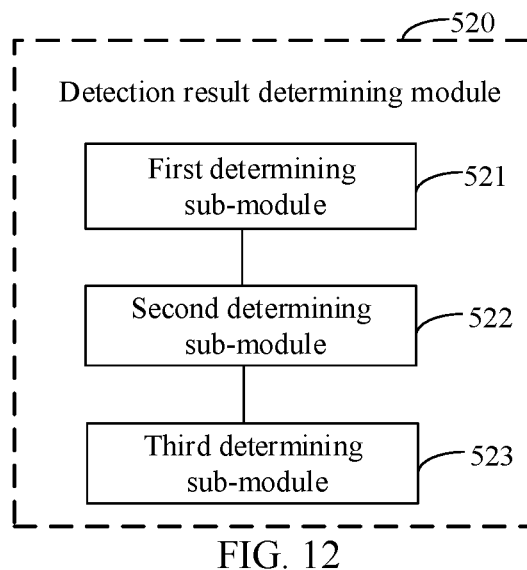
FIG. 12 is a block diagram of another information acquisition device according to some embodiments of the present disclosure.

FIG. 12 is a block diagram of another information acquisition device according to some embodiments. As shown in FIG. 12, on the basis of the foregoing embodiment of FIG. 11, the detection result determining module 520 includes:

a first determining sub-module 521, configured to determine, according to the privacy-related information, App identification information of the target App and first privacy information of the terminal acquired by the target App;

a second determining sub-module 522, configured to determine second privacy information corresponding to the App identification information of the target App according to a correspondence between preset App identification information and privacy information allowed to be acquired when the App is called; and a third determining sub-module 523, configured to determine the target detection result as that the process of the target App acquiring the privacy information of the terminal complies with the preset user privacy protection rule in response to that the second privacy information includes the first privacy information, and otherwise determine the target detection result as that the process of the target App acquiring the privacy information of the terminal does not comply with the preset user privacy protection rule.

Figure 13:
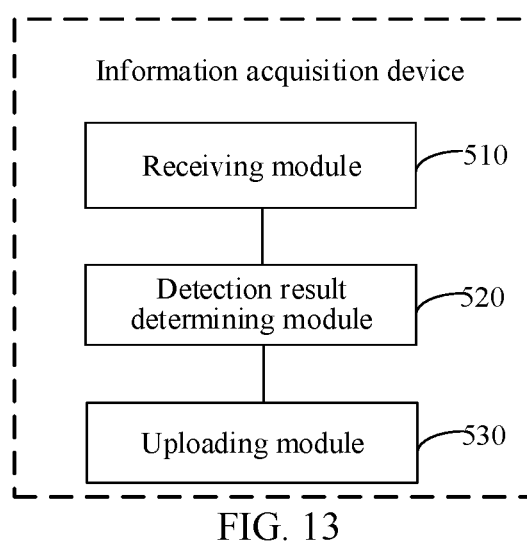
FIG. 13 is a block diagram of another information acquisition device according to some embodiments of the present disclosure.

FIG. 13 is a block diagram of another information acquisition device according to some embodiments. As shown in FIG. 13, based on the foregoing embodiment of FIG. 11, the device further includes:

an uploading module 530, configured to upload the target detection result to a detection platform.

Since the device embodiments basically correspond to the method embodiments, the relevant parts thereof can be referred to the description of the method embodiments. The device embodiments described above are only exemplary. The units described as separated parts may or may not be physically separated, and the parts displayed as units may or may not be physical units, that is, the units may be located in one place, or may be distributed over multiple network units. Some or all of the units may be selected according to actual needs to achieve the solutions in the embodiments. Those of ordinary skill in the art can understand and implement the same without paying creative labor.

Correspondingly, the present disclosure also provides a computer-readable storage medium that stores a computer program, and the computer program is configured to execute any of the information acquisition methods on the terminal side described above.

Correspondingly, the present disclosure also provides a computer-readable storage medium that stores a computer program, and the computer program is configured to execute any of the information acquisition methods on the server side described above.

Correspondingly, the present disclosure also provides an information acquisition device, which is applied to a terminal and includes:

a processor; and a memory device for storing executable instructions of the processor, wherein, the processor is configured to:

acquire privacy-related information when calling, by a target application (App), an application programming interface (API) to acquire privacy information of the terminal, wherein the privacy-related information is associated with a process of the target App acquiring the privacy information;

store the privacy-related information; and read, by a designated App, the privacy-related information stored in a preset time period, and upload, by the designated App, the privacy-related information read to a server.

Figure 14:
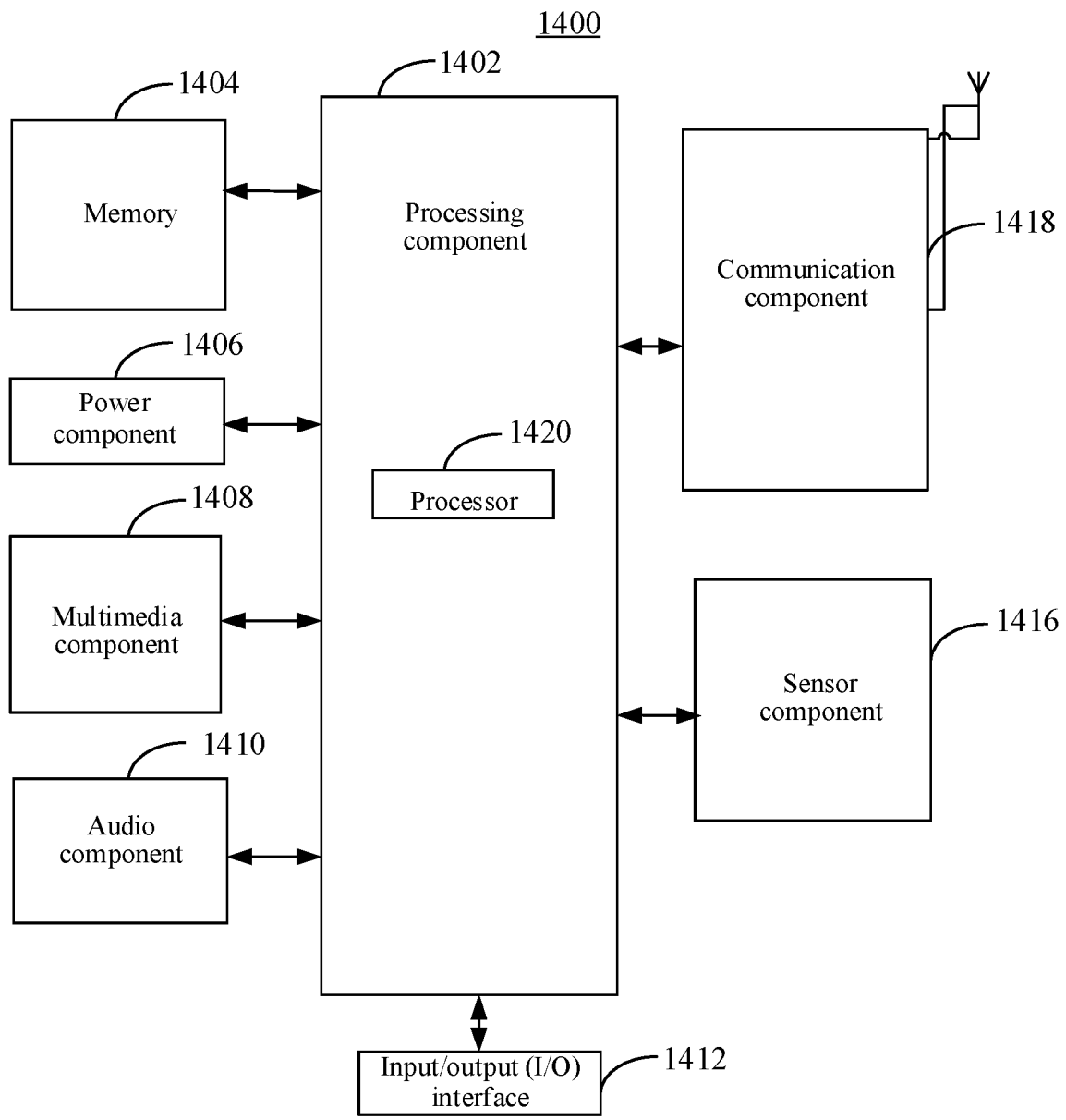
FIG. 14 is a schematic structural diagram of an information acquisition device according to some embodiments of the present disclosure.

FIG. 14 is a block diagram of an electronic device 1400 according to some embodiments. For example, the electronic device 1400 may be a terminal such as a mobile phone, a tablet computer, an e-book reader, a multimedia playback device, a wearable device, an in-vehicle terminal, etc.

Referring to FIG. 14, the electronic device 1400 may include one or more of the following components: a processing component 1402, a memory 1404, a power component 1406, a multimedia component 1408, an audio component 1410, an input/output (I/O) interface 1412, a sensor component 1416, and a communication component 1418.

The processing component 1402 typically controls overall operations of the electronic device 1400, such as operations associated with display, telephone calls, data communications, camera operations, and recording operations. The processing component 1402 can include one or more processors 1420 to execute instructions to perform all or part of the steps in the above described methods. Moreover, the processing component 1402 can include one or more modules to facilitate interaction between the processing component 1402 and other components. For example, the processing component 1402 can include a multimedia module to facilitate the interaction between the multimedia component 1408 and the processing component 1402.

The memory 1404 is configured to store various types of data to support the operation of the electronic device 1400. Examples of such data include instructions for any application or method operated on device 1400, contact data, phone book data, messages, pictures, videos, and the like. The memory 1404 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the electronic device 1400. The power component 1406 can include a power management system, one or more power sources, and other components associated with generation, management, and distribution of power in the electronic device 1400.

The multimedia component 1408 includes a screen providing an output interface between the electronic device 1400 and a user. In some embodiments, the multimedia component 1408 includes a front camera and/or a rear camera. When the electronic device 1400 is in an operation mode, such as a photographing mode or a video mode, the front camera and/or the rear camera can receive external multimedia datum. Each of the front camera and the rear camera may be a fixed optical lens system or have focus and optical zoom capability.

The audio component 1410 is configured to output and/or input an audio signal. For example, the audio component 1410 includes a microphone (MIC) configured to receive an external audio signal when the electronic device 1400 is in an operation mode, such as a call mode, a recording mode, and a voice recognition mode. The received audio signal may be further stored in the memory 1404 or sent via the communication component 1418. In some embodiments, the audio component 1410 also includes a speaker for outputting the audio signal.

The I/O interface 1412 provides an interface between the processing component 1402 and peripheral interface modules, such as a keyboard, a click wheel, buttons, and the like. These buttons may include, but are not limited to, a home button, a volume button, a starting button, and a locking button.

The sensor component 1416 includes one or more sensors for providing status assessments of various aspects of the electronic device 1400. For example, the sensor component 1416 can detect an on/off status of the electronic device 1400, relative positioning of components such as the display and the keypad of the electronic device 1400. The sensor component 1416 can also detect a change in position of one component of the electronic device 1400 or the electronic device 1400, presence or absence of user contact with the electronic device 1400, an orientation or an acceleration/deceleration of the electronic device 1400, and a change in temperature of the electronic device 1400. The sensor component 1416 can include a proximity sensor configured to detect the presence of nearby objects without any physical contact. The sensor component 1416 can also include a light sensor, such as a CMOS or CCD image sensor, configured to be used in imaging applications. In some embodiments, the sensor component 1416 can also include an accelerometer sensor, a gyroscope sensor, a magnetic sensor, a pressure sensor, or a temperature sensor.

The communication component 1418 is configured to facilitate wired or wireless communication between the electronic device 1400 and other devices. The electronic device 1400 can access a wireless network based on a communication standard, such as Wi-Fi, 2G, 3G, 4G or 5G, or a combination thereof. In some embodiments, the communication component 1418 receives broadcast signals or broadcast associated information from an external broadcast management system via a broadcast channel. In some embodiments, the communication component 1418 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the electronic device 1400 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components, so as to execute the above methods.

In some embodiments, there is also provided a non-transitory computer-readable storage medium including instructions, such as the memory 1404 including instructions executable by the processor 1420 of the electronic device 1400 to perform the above described method. For example, the non-transitory computer readable storage medium may be a ROM, a random access memory (RAM), a CD-ROM, a magnetic tape, a floppy disc, and an optical data storage device.

Correspondingly, the present disclosure also provides an information acquisition device, which can be applied to a server side and include:

a processor; and a memory device for storing executable instructions of the processor, wherein the processor is configured to:

receive privacy-related information uploaded by a terminal, wherein the privacy-related information is information associated with a process of a target application (App) acquiring privacy information of the terminal; and determine a target detection result according to the privacy-related information, wherein the target detection result is configured to indicate whether the process of the target App acquiring the privacy information of the terminal complies with a preset user privacy protection rule.

Figure 15:
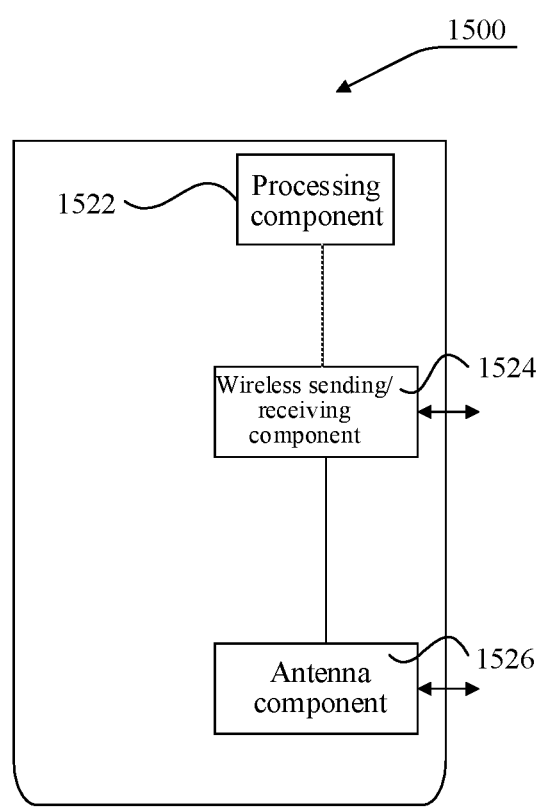
FIG. 15 is a schematic structural diagram of another information acquisition device according to some embodiments of the present disclosure.

FIG. 15 is a schematic structural diagram of an information acquisition device 1500 according to some embodiments. The device 1500 may be provided as a server. Referring to FIG. 15, the device 1500 includes a processing component 1522, a wireless sending/receiving component 1524, an antenna component 1526, and a signal processing part specific to the wireless interface. The processing component 1522 may further include one or more processors.

One of the processors in the processing component 1522 can be configured to perform the information acquisition method described above.

Various embodiments of the present disclosure can have one or more of the following advantages.

Upon that the API is called by the target App to acquire the privacy information of the terminal, the privacy-related information associated with such process may be determined according to the instrumentation information in the API. Then the privacy-related information is stored. After that, the privacy-related information stored in the preset time period may be read by the designated App, and the read privacy-related information is uploaded to the server side by the designated App. Subsequently, the server side determines, according to the privacy-related information, whether the process of the target App acquiring the privacy information of the terminal complies with the preset user privacy protection rule. Various embodiments of the present disclosure can detect whether the process of the target App acquiring the privacy information of the terminal complies with the preset user privacy protection rule, thereby protecting personal privacy of a terminal user and improving network security.

The instrumentation can be performed in advance, by the ROM of the terminal, on the plurality of the APIs being called to acquire the privacy information in the framework layer, and may be performed for each piece of the private information. Subsequently, the privacy-related information is determined directly according to the instrumentation information in the API, which is easy to be implemented and has high availability.

The privacy-related information includes, but is not limited to, at least one of the process and thread information, the context information and the log information, which are associated with the process of the target App acquiring the privacy information of the terminal. It is convenient for the server side to determine subsequently, according to the privacy-related information, the detection result of indicating whether the process of the target App acquiring the privacy information of the terminal complies with the preset user privacy protection rule, which can have a high availability.

The API in the designated App can be called to store the privacy-related information to the designated directory, and then the privacy-related information stored in the designated directory in the preset time period can be read by the designated App, which is easy to be implemented and has high availability.

As storage space occupied by the privacy-related information is relatively large, the directory preset on the secure digital memory card for storing the privacy-related information can be used as the designated directory, thereby storing the privacy-related information to ensure that the complete privacy-related information can be stored.

The target process in the designated App can be used to perform the reading of the privacy-related information and uploading of the same to the server side. The target process is a process of the designated App which is online at any time. Since the target process is online all the time, there is no need to start a separate process to read and upload the privacy-related information, thereby saving process resources.

After receiving the privacy-related information uploaded by the terminal, the server side can determine, according to the privacy-related information, the target detection result indicating whether the process of the target App acquiring the privacy information of the terminal complies with the preset user privacy protection rule. It achieves the purpose of detecting whether the process of the target App acquiring the privacy information of the terminal complies with the preset user privacy protection rule, so that the personal privacy of the terminal user can be protected and the network security can be improved.

The server side can determine the App identification information of the target App and the first privacy information of the terminal acquired by the target App according to the privacy-related information. The second privacy information corresponding to the target App can be determined according to the correspondence between the preset App identification information and the privacy information allowed to be acquired when the App is called. If the first privacy information is included in the second privacy information, it is determined that the target detection result is that the process of the target App acquiring the privacy information of the terminal complies with the preset user privacy protection rule, and otherwise it is determined that the target detection result is that the process of the target App acquiring the privacy information of the terminal does not comply with the preset user privacy protection rule, which is easy to be implemented and has high availability.

The server side can also upload the target detection result to the detection platform. The detection platform outputs or displays the same, so that the terminal privacy protection analysis can be better performed.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. An information acquisition method, applied to a terminal, comprising:
   performing, by a read-only memory (ROM), instrumentation on a plurality of application programming interfaces (APIs) being called to acquire privacy information of the terminal in a framework layer for each piece of the privacy information;
   determining privacy-related information according to instrumentation information in the API when calling, with a target application (App), the API to acquire the privacy information, wherein the privacy-related information is associated with a process of the target App acquiring the privacy information;
   storing the privacy-related information; and
   reading, with a designated App, the privacy-related information stored in a preset time period, and uploading, with the designated App, the privacy-related information read to a server side;

wherein said reading comprises:
reading, by a target process of the designated App, the privacy-related information stored in the preset time period; and
uploading, by the target process, the privacy-related information read to the server side,
wherein the designated App is an App installed on the terminal and associated with privacy protection on the terminal, and the target process is a process of the designated App which is online at any time.

2. The method according to claim 1, wherein the privacy information comprises at least one of:
international mobile equipment identity (IMEI) information of the terminal, system identification information of the terminal, and a mobile phone number of the terminal.

3. The method according to claim 1, wherein the privacy-related information comprises at least one of:
process and thread information, context information, and log information.

4. The method according to claim 1, wherein
the storing the privacy-related information comprises:
storing the privacy-related information to a designated directory by calling the API in the designated App; and
the reading, by a designated App, the privacy-related information stored in a preset time period comprises:
reading, by the designated App, the privacy-related information stored in the designated directory in the preset time period.

5. The method according to claim 4, wherein the designated directory is a directory preset on a secure digital memory card for storing the privacy-related information.

6. An information acquisition method, applied to a server side, comprising:
receiving privacy-related information read and uploaded by a target process of a designated App of a terminal, wherein the privacy-related information is determined according to instrumentation information in an application programming interface (API) when calling, by a target application (App), the API to acquire privacy information of the terminal, the privacy-related information is associated with a process of the target application (App) acquiring the privacy information, the designated App is an App installed on the terminal and associated with privacy protection on the terminal, and the target process is a process of the designated App which is online at any time; and wherein the instrumentation is performed, by a read-only memory (ROM), on a plurality of the APIs being called to acquire the privacy information in a framework layer for each piece of the private information; and
determining a target detection result according to the privacy-related information, wherein the target detection result is configured to indicate whether the process of the target App acquiring the privacy information of the terminal complies with a preset user privacy protection rule.

7. The method according to claim 6, wherein the determining a target detection result according to the privacy-related information comprises:
determining, according to the privacy-related information, App identification information of the target App and first privacy information of the terminal acquired by the target App;
determining second privacy information corresponding to the App identification information of the target App according to a correspondence between preset App identification information and privacy information allowed to be acquired when the App is called; and
determining the target detection result as that the process of the target App acquiring the privacy information of the terminal complies with the preset user privacy protection rule in response to that the second privacy information comprises the first privacy information, and otherwise determining the target detection result as that the process of the target App acquiring the privacy information of the terminal does not comply with the preset user privacy protection rule.

8. The method according to claim 6, further comprising:
uploading the target detection result to a detection platform.

9. An information acquisition device, applied to a terminal, comprising:
a processor; and
a memory device storing executable instructions of the processor that, when being executed by the processor, cause the processor to implement an information acquisition method,
wherein the information acquisition method comprises:
performing, by a read-only memory (ROM), instrumentation on a plurality of application programming interfaces (APIs) being called to acquire privacy information of the terminal in a framework layer for each piece of the privacy information;
determining privacy-related information according to instrumentation information in the API when calling, by a target application (App), the API to acquire the privacy information, wherein the privacy-related information is associated with a process of the target App acquiring the privacy information;
storing the privacy-related information; and
reading, by a designated App, the privacy-related information stored in a preset time period, and uploading, by the designated App, the privacy-related information read to a server side;
wherein said reading comprises:
reading, by a target process of the designated App, the privacy-related information stored in the preset time period; and
uploading, by the target process, the privacy-related information read to the server side,
wherein the designated App is an App installed on the terminal associated with privacy protection on the terminal, and the target process is a process of the designated App which is online at any time.

10. The information acquisition device according to claim 9, wherein the privacy information comprises at least one of:
international mobile equipment identity (IMEI) information of the terminal, system identification information of the terminal, and a mobile phone number of the terminal.

11. The information acquisition device according to claim 9, wherein the privacy-related information comprises at least one of:
process and thread information, context information, and log information.

12. The information acquisition device according to claim 9, wherein
the storing the privacy-related information comprises:
storing the privacy-related information to a designated directory by calling the API in the designated App; and
the reading, by a designated App, the privacy-related information stored in a preset time period comprises:

reading, by the designated App, the privacy-related information stored in the designated directory in the preset time period.

13. The information acquisition device according to claim 12, wherein the designated directory is a directory preset on a secure digital memory card for storing the privacy-related information.

* * * * *